Nov. 12, 1957  Q. C. BUFOGLE  2,812,783
DEVICE FOR INJECTING CHEMICALS INTO VEHICLE TIRES AND THE LIKE
Filed Oct. 28, 1954  2 Sheets-Sheet 1
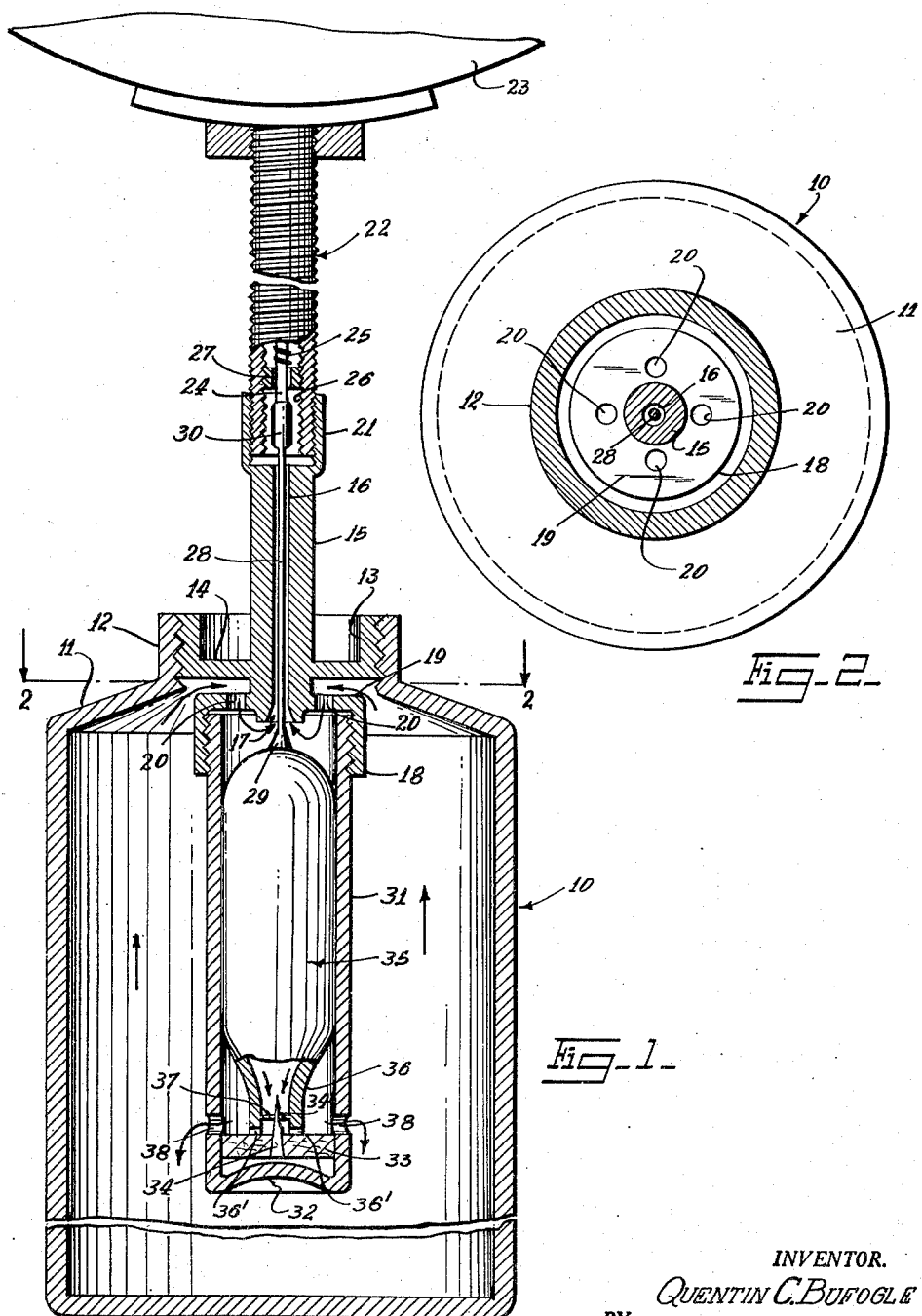
INVENTOR.
QUENTIN C. BUFOGLE
BY
ATTORNEY Nov. 12, 1957  Q. C. BUFOGLE  2,812,783
DEVICE FOR INJECTING CHEMICALS INTO VEHICLE TIRES AND THE LIKE
Filed Oct. 28, 1954  2 Sheets-Sheet 2

INVENTOR.
QUENTIN C. BUFOGLE
BY
ATTORNEY

United States Patent Office 2,812,783
Patented Nov. 12, 1957

2,812,783

DEVICE FOR INJECTING CHEMICALS INTO VEHICLE TIRES AND THE LIKE

Quentin C. Bufogle, Brooklyn, N. Y.

Application October 28, 1954, Serial No. 465,328

14 Claims. (Cl. 141—38)

This invention relates to a device for injecting, under a predetermined amount of pressure, a gummy, viscous substance such as a liquified rubber compound, into vehicle tires for the purpose of sealing punctures.

An important object of the present invention is to provide a device of the nature referred to wherein there will be incorporated means for releasing, within the interior of a container for the sealing compound, gas under pressure for the purpose of placing said compound under pressure, said means being so designed as to permit use of a conventional carbon-dioxide-filled cartridge.

Another object is to facilitate the controlled injection of the viscous substance into the vehicle tire under pressure, through the medium of a valve assembly provided upon a nozzle, which nozzle is in communication with the interior of the container and is adapted to inject into the vehicle tire the sealing tire compound after the compound has been placed under pressure.

Another object is to provide an improved holder for the cartridge, which holder will be provided with means aiding in capping the container prior to rupturing of the cartridge, the holder being bodily removable from the container with marked ease to permit replacement of the cartridge.

Yet another object is to provide a container which is pressurized in advance, prior to sealing thereof, and is equipped with a novel valve assembly, said valve assembly including a valve-opening rod which, when engaging at one end, the conventional valve assembly of a vehicle tire, will cause opening of said tire valve assembly simultaneously with the opening of the container, whereby to release the container contents into the vehicle tire as long as the pressure within the container is greater than that in the tire.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a vertical sectional view through a preferred embodiment of the present invention showing the same in operative engagement with a tire valve assembly.

Fig. 2 is a transverse sectional view taken along the line 2—2 of Fig. 1.

Figure 3:
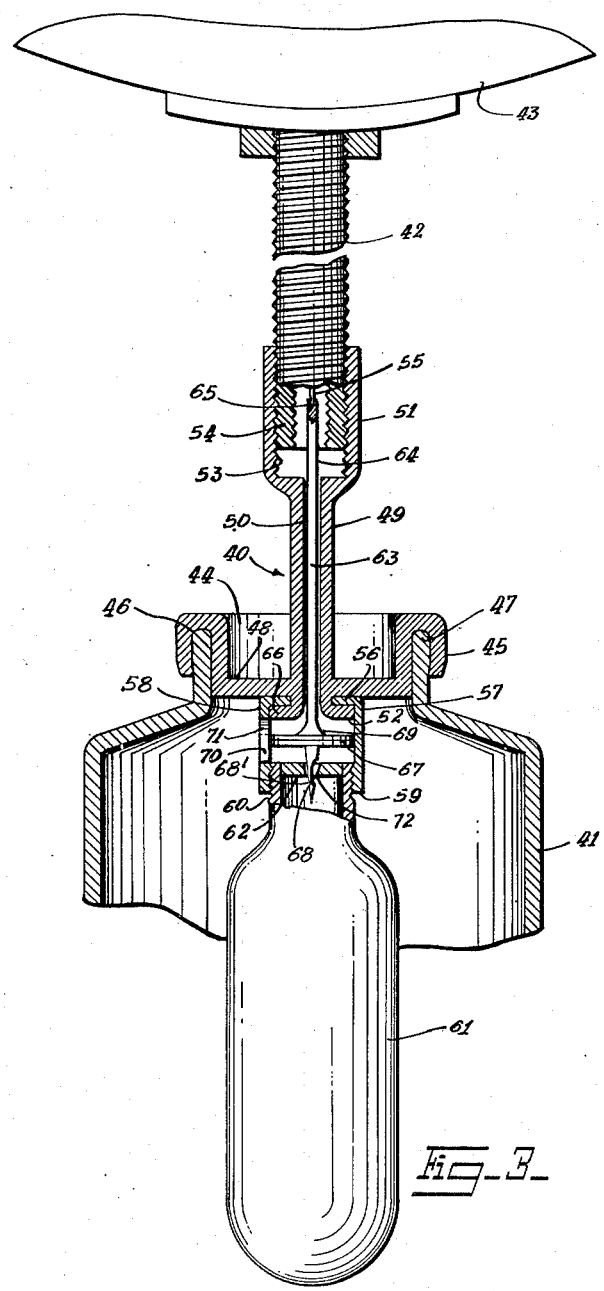
Fig. 3 is a view similar to Fig. 1 but illustrating a modification of the present invention.

Referring now more in detail to the drawing, 10 indicates generally a metallic container having a frustoconical neck 11 and a cylindrical mouth 12, the mouth 12 being internally threaded for a purpose which will hereinafter become clear.

An externally threaded cup-shaped member 13 is screwed downwardly into the internally threaded neck 12, the bottom wall 14 of the cup-shaped member 13 being integrally formed with an elongated bearing member 15 extending upwardly therefrom as well as downwardly therebelow. The bearing member 15 is provided with a central bore 16, the lower end of which is enlarged into a frusto-conical inverted valve seat 17. The bearing member 15 below the cup-shaped member 13 is integrally formed with an inverted, internally threaded cup-shaped member 18, the top wall 19 of the cup-shaped member 18 having a plurality of angularly arranged openings 20 therethrough.

The upper end of the bearing member 15 is integrally formed with an enlarged internally threaded, cup-shaped portion 21 adapted to be screwed onto the externally threaded conventional tire valve assembly 22 carried by the tire 23, the assembly 22 including the usual spring-urged pin 24, which, when moved inwardly against the action of the spring 25 will serve to open the valve assembly 22, in a manner well known to those skilled in the art. As shown in Fig. 1 the valve assembly 22 is provided with an internally threaded bore 26 which encloses the pin 24, positioning an externally threaded plug 27 which receives the pin 24 therethrough and which also serves to abut one end of spring 25.

An elongated rod 28 is slidably disposed within bore 16 the rod 28 extending beyond the bearing member 15 at each end thereof and terminating at its lower end in a frusto-conical enlargement 29 adapted to be received within the valve seat 17 whereby to close the latter when the rod 28 is in the raised position. The other end of the rod 28 is formed with a flattened enlargement 30 which is adapted to engage the end of pin 24 and which also serves to limit the downward displacement of the rod 28 through bore 16.

A hollow cylindrical casing 31 open at one end is integrally formed at the other end with a concave closure 32, the open end of the casing 31 being externally threaded and screwed into the cup-shaped member 18. A resilient pad 33 is supported on closure 32, a thumb tack or other pointed instrument 34 resting on closure 32, and piercing the pad 33, the upper point of the prong 34 extending slightly upwardly above the pad 33. The casing 31 is adapted to snugly receive there-within a conventional carbon dioxide capsule indicated generally at 35 and including the usual narrow neck 36 which terminates in the relatively thin closure wall 37 spaced inwardly from the lower end of neck 36 to avoid the accidental puncturing of the former.

In assembly, with the pad 33 and prong 34 positioned above the closure 32 of casing 31, the carbon dioxide cartridge 35 is inserted downwardly therewithin with the closure 37 just resting on the prong 34. The casing 31 above the pad 33 is provided with the angularly spaced openings 38. With the frusto-conical lower end 29 of the rod 28 resting freely on the upper end of capsule 35, the externally threaded upper end of the casing 31 is screwed into the cup-shaped member 18 whereupon the cup-shaped member 13 is then screwed downwardly into neck 12 to complete the closure, the container 10 having previously been filled with a gummy viscous substance, such as a liquified rubber compound.

The upper end 30 of rod 28 is then forced downwardly within the cup-shaped member 21, which action forces the cartridge 35 downwardly and causes the prong 34 to puncture the diaphragm 37, permitting the discharge of the pressurized nitrous oxide or any other suitable gas, within casing 31 through the indented portion 34' of the prong 34 and the radial grooves 36' of the capsule neck 36. The gas passes outwardly through the openings 38 in the direction of the arrows and upwardly to the cup-shaped member 18 where it passes downwardly through the angularly spaced openings 20 and attempts to escape through bore 16. However, the pressurized gas forces the rod 28 upwardly and forces the lower end 29 thereof into the valve seat 17, automatically sealing the container.

When the contents of the container is to be released into tire 23, the cup-shaped portion is screwed onto the externally threaded outer end of the tire valve assembly 22, bringing the pin 24 into contact with the upper end 30 of rod 28. The entire container 10 is rotated with the cup-shaped portion 21 during this step, and ultimately, the pin 24, bearing against the upper end 30 of rod 28, depresses the frusto-conical lower end 29 from valve seat 17 and permits the compound to pass upwardly through bore 16 and into the tire. Both the container valve and the tire valve are thus opened simultaneously, and the container contents, which have been pressurized previously, will flow through the open tire valve and container valve into the vehicle tire. The flow will continue as long as there is greater pressure within the container than there is within the vehicle tire.

Upon unscrewing the cup-shaped portion 21 from the valve assembly 22, internal pressure within the container 10 will again automatically move the lower end 29 of rod 28 into the valve seat 17, thus automatically sealing the container until it is again used.

The modification of the present invention illustrated in Fig. 3 is characterized by the provision of a cap and valve assembly 40 adapted to fit on and extend into a can or container 41 and removably to connect to a conventional tire valve assembly 42 carried by a tire or tire tube 43.

Cap and valve assembly 40 has a cap member 44 with bent over peripheral portions 45 frictionally clamped or otherwise secured to the lip 47 of can or container 41 thereby forming a seal 46. Both the can 41 and cap member 44 preferably are of metal.

Cap member 44 has a bottom wall 48 through the center of which extends an elongated central member 49 having an axial bore 50, an upper enlarged end 51 and a lower end 52. The upper end 51 of member 49 has internal threads 53 adapted to fit the externally threaded free end 54 of the tire valve assembly 42 inside which assembly is the usual tire valve pin 55.

The lower end 52 of central member 49 is outwardly flanged and bent over to hold an inwardly directed upper flange 56 of an inverted cup-shaped member 57 having a side 58. Cup-shaped member 57 has a lower internally threaded open free end 59 adapted removably to receive and hold the externally threaded upper end 60 of a carbon-dioxide filled cartridge or cylinder 61. The $CO_2$ cylinder 61 has the usual relatively thin closure wall 62 disposed in its upper end 60.

A valve stem or rupture rod 63 is slidably mounted in the axial bore 50 of central member 49. Rod 63 has an upper end 64 with a central recess 65 aligned with and adapted removably to receive the free end of the tire valve pin 55. The lower end of bore 50 of central member 49 is formed to provide a valve seat 66 and rod 63 has a disc 67 adjacent its lower end 68 slidably mounted in the cup-shaped member 57 with a valve seating portion 69 adapted to fit in seat 66. The lower end 68 of rod 63 is pointed and adapted to puncture or rupture the thin closure wall 62 of the $CO_2$ cylinder 61. Disc 67 on rod 63 is disposed to move axially in the cup-shaped member 57 and to divide the side 58 of member 57 into two parts, an outlet port 70 for carbon dioxide and an inlet port 71 for contents of the can or container 41.

The operation of the structure as shown in the modification is as follows: Container 41 is filled with puncture sealing compound. A filled $CO_2$ cylinder 61 is attached to the cup-shaped member 57 by screwing it into the open internally threaded open end of member 57. The cap member 44 is then secured to the lip 47 of container 41 by the usual clamping or pressure means. The sharp puncturing or rupturing end 68 of the slidable rod 63 will be disposed over the relatively thin closure wall 62 of the $CO_2$ cartridge or cylinder 61 but will in no case puncture or rupture the wall 62 until forced through it.

The upper end 64 of rod 63 will be enclosed and disposed in the upper end 51 of the housing member 49. When the upper end 51 of member 49 is screwed onto a tire valve assembly 42 the free end of tire valve pin 55 will fit into the central recess 65 of rod 63 and force the rod 63 toward the $CO_2$ cartridge 61 until the pointed end 68 of rod 63 punctures the closure wall 62 of the $CO_2$ cartridge. After such puncturing, the member 49 may be screwed back slightly to permit the carbon dioxide gas by its pressure to dislodge the point 68 from the puctured opening 72 in wall 62 and to escape through opening 72 or to permit the escape of the carbon dioxide gas through the indented portion 68' of the pointed end 68. In so escaping, the gas blows against disc 67 on rod 63 and moves the rod 63 back against the tire valve pin 55 in which position disc 67 divides the side port opening 58 of cup member 57 into an outlet port 70 for the $CO_2$ gas and an inlet port 71 for the contents of the can 41 which will be forced out this opening under pressure of the $CO_2$ gas, up through the bore 50 of member 49 and through the tire valve assembly into the tire or tube to seal a puncture therein.

It is to be understood that when the device shown in Fig. 1 is used, it is inverted so that the metallic container 10 is located above the valve assembly 22.

While I have illustrated and described the preferred embodiment of my invention, it is to be understood that I do not limit myself to the precise construction herein disclosed.

Having thus described my invention, what I claim as new and desire to secure by United States Letters Patent is:

1. A device for injecting a fluid puncture sealing compound into a vehicle tire comprising a container adapted to hold a quantity of said compound, the container having an outlet, a closure for said outlet, an elongated bearing member having a central longitudinal bore connected to said closure and extending inwardly of the container, a valve seat at the inner end of said elongated bearing member communicating with said bore, a valve stem within said bore and terminating in a valve adapted to reside in said valve seat, said valve stem extending outwardly of said bearing member, an interior casing adapted to receive therewithin a compressed gas capsule with the puncture end of the latter disposed lowermost, means at the lower end of said casing for puncturing said capsule upon downward movement therewithin, the lower end of said valve stem bearing on the upper end of the capsule whereby to force the latter downwardly upon downward movement of said valve stem, and vent means permitting discharge of the compressed gas into the interior of the container proper and communicating with said valve seat whereby to urge the valve into a closed position under internal pressure.

2. A device for injecting a fluid puncture sealing compound into a vehicle tire comprising a container adapted to hold a quantity of said compound, the container having an outlet, a closure for said outlet, an elongated bearing member having a central longitudinal bore connected to said closure and extending inwardly of the container, a valve seat at the inner end of said elongated bearing member communicating with said bore, a valve stem within said bore and terminating in a valve adapted to reside in said valve seat, said valve stem extending outwardly of said bearing member, an interior casing adapted to receive therewithin a compressed gas capsule with the puncture end of the latter disposed lowermost, means at the lower end of said casing for puncturing said capsule upon downward movement therewithin, the lower end of said valve stem bearing on the upper end of the capsule whereby to force the latter downwardly upon downward movement of said valve stem, and vent means permitting discharge of the compressed gas into the interior of the container proper and communicating with said valve seat whereby to urge the valve into a closed position under internal pressure, the outer end of said bearing member having an internally threaded cup-shaped member communicating with said bore and adapted to be screwed onto a tire valve assembly with the outer end of said valve stem in contact with the tire valve assembly release pin whereby to depress the tire valve and said valve simultaneously and to permit flow of the container contents through the connected valve casings.

3. A device for injecting a fluid puncture sealing compound into a vehicle tire comprising a container adapted to hold a quantity of said compound, the container having an outlet, a closure for said outlet, an elongated bearing member having a central longitudinal bore connected to said closure and extending inwardly of the container, a valve seat at the inner end of said elongated bearing member communicating with said bore, a valve stem within said bore and terminating in a valve adapted to reside in said valve seat, said valve stem extending outwardly of said bearing member, an interior casing adapted to receive therewithin a compressed gas capsule with the puncture end of the latter disposed lowermost, means at the lower end of said casing for puncturing said capsule upon downward movement therewithin, the lower end of said valve stem bearing on the upper end of the capsule whereby to force the latter downwardly upon downward movement of said valve stem, and vent means permitting discharge of the compressed gas into the interior of the container proper and communicating with said valve seat whereby to urge the valve into a closed position under internal pressure, the outer end of said bearing member having an internally threaded cup-shaped member communicating with said bore and adapted to be screwed onto a tire valve assembly with the outer end of said valve stem in contact with the tire valve assembly release pin whereby to depress the tire valve and said valve simultaneously and to permit flow of the container contents through the connected valve casings, said interior valve casing having a closure at the lower end thereof, a resilient pad supported on said lower end closure, a prong supported on said closure and piercing said pad and extending upwardly thereabove, the lower end of the capsule being supported on said resilient pad.

4. A device for injecting a fluid puncture sealing compound into a vehicle tire comprising a container adapted to hold a quantity of said compound, the container having an outlet, a closure for said outlet, an elongated bearing member having a central longitudinal bore connected to said closure and extending inwardly of the container, a valve seat at the inner end of said elongated bearing member communicating with said bore, a valve stem within said bore and terminating in a valve adapted to reside in said valve seat, said valve stem extending outwardly of said bearing member, an interior casing adapted to receive therewithin a compressed gas capsule with the puncture end of the latter disposed lowermost, means at the lower end of said casing for puncturing said capsule upon downward movement therewithin, the lower end of said valve stem bearing on the upper end of the capsule whereby to force the latter downwardly upon downward movement of said valve stem, and vent means permitting discharge of the compressed gas into the interior of the container proper and communicating with said valve seat whereby to urge the valve into a closed position under internal pressure, the outer end of said bearing member having an internally threaded cup-shaped member communicating with said bore and adapted to be screwed onto a tire valve assembly with the outer end of said valve stem in contact with the tire valve assembly release pin whereby to depress the tire valve and said valve simultaneously and to permit flow of the container contents through the connected valve casings, said interior valve casing having a closure at the lower end thereof, a resilient pad supported on said lower end closure, a prong supported on said lower end closure and piercing said pad and extending upwardly thereabove, the lower end of the capsule being supported on said resilient pad, said vent means including spaced openings adjacent the prongs to permit escape of compressed gas into the container proper.

5. A device for injecting a fluid puncture sealing compound into a vehicle tire comprising a container adapted to hold a quantity of said compound, the container having an outlet, a closure for said outlet, an elongated bearing member having a central longitudinal bore connected to said closure and extending inwardly of the container, a valve seat at the inner end of said elongated bearing member communicating with said bore, a valve stem within said bore and terminating in a valve adapted to reside in said valve seat, said valve stem extending outwardly of said bearing member, a hollow cylindrical casing adapted to receive therewithin a compressed gas capsule with the puncture end of the latter disposed lowermost means at the lower end of said casing for puncturing said capsule upon downward movement therewithin, the lower end of said valve stem bearing on the upper end of the capsule whereby to force the latter downwardly upon downward movement of said valve stem, and vent means permitting discharge of the compressed gas into the interior of the container proper and communicating with said valve seat whereby to urge the valve into a closed position under internal pressure, said container outlet being internally threaded, an externally threaded closure adapted to be screwed therein, said bearing member extending upwardly above said outlet, an inverted cup-shaped internally threaded member secured to the lower end of said bearing member, said hollow cylindrical casing open at one end and having a closure at the other end, the open end of said cylindrical casing being externally threaded and screwed into said inverted cup-shaped member, and the other end of said valve stem extending outwardly of said bearing member.

6. A device for injecting a fluid puncture sealing compound into a vehicle tire comprising a container adapted to hold a quantity of said compound, the container having an outlet, a closure for said outlet, an elongated bearing member having a central longitudinal bore connected to said closure and extending inwardly of the container, a valve seat at the inner end of said elongated bearing member communicating with said bore, a valve stem within said bore and terminating in a valve adapted to reside in said valve seat, said valve stem extending outwardly of said bearing member, a hollow cylindrical casing adapted to receive therewithin a compressed gas capsule with the puncture end of the latter disposed lowermost, means at the lower end of said casing for puncturing said capsule upon downward movement therewithin, the lower end of said valve stem bearing on the upper end of the capsule whereby to force the latter downwardly upon downward movement of said valve stem, and vent means permitting discharge of the compressed gas into the interior of the container proper and communicating with said valve seat whereby to urge the valve into a closed position under internal pressure, said container outlet being internally threaded, an externally threaded closure adapted to be screwed therein, said bearing member extending upwardly above said outlet, an inverted cup-shaped internally threaded member secured to the lower end of said bearing member, said hollow cylindrical casing open at one end and having a closure at the other end, the open end of said cylindrical casing being externally threaded and screwed into said inverted cup-shaped member, the other end of said valve stem extending outwardly of said bearing member, said hollow cylindrical casing having a concave closure at its lower end, said puncture means including a prong extending upwardly within said casing and supported on said closure, a resilient pad supported on said closure, said prong piercing said pad, said pad being adapted to support the capsule within said casing, said vent means including a plurality of angularly spaced openings near said prong whereby to permit the escape of compressed gas upon the puncture of said capsule, the inner end of said valve stem resting directly on the upper end of the capsule.

7. A device for injecting a fluid puncture sealing compound into a vehicle tire comprising a container adapted to hold a quantity of said compound, the container having an outlet, a closure for said outlet, an elongated bearing member having a central longitudinal bore connected to said closure and extending inwardly of the container, a valve seat at the inner end of said elongated bearing member communicating with said bore, a valve stem within said bore and terminating in a valve adapted to reside in said valve seat, said valve stem extending outwardly of said bearing member, a hollow cylindrical casing adapted to receive therewithin a compressed gas capsule with the puncture end of the latter disposed lowermost, means at the lower end of said casing for puncturing said capsule upon downward movement therewithin, the lower end of said valve stem bearing on the upper end of the capsule whereby to force the latter downwardly upon down movement of said valve stem, and vent means permitting discharge of the compressed gas into the interior of the container proper and communicating with said valve seat whereby to urge the valve into a closed position under internal pressure, said container outlet being internally threaded, an externally threaded closure adapted to be screwed therein, said bearing member extending upwardly above said outlet, an inverted cup-shaped internally threaded member secured to the lower end of said bearing member, said hollow cylindrical casing open at one end and having a closure at the other end, the open end of said cylindrical casing being externally threaded and screwed into said inverted cup-shaped member, the other end of said valve stem extending outwardly of said bearing member, said hollow cylindrical casing having a concave closure at its lower end, said puncture means including a prong extending upwardly within said casing and supported on said closure, a resilient pad supported on said closure, said prong piercing said pad, said pad being adapted to support the capsule within said casing, said vent means including a plurality of angularly spaced openings near said prong whereby to permit the escape of compressed gas upon the puncture of said capsule, the inner end of said valve stem resting directly on the upper end of the capsule, a substantially cup-shaped internally threaded member at the upper end of said bearing member adapted to be screwed onto a tire valve assembly with the upper end of said valve stem in contact with the tire valve assembly release pin whereby to depress said valve and to release the tire valve assembly simultaneously and to permit the flow of the container contents through the connected valve casings.

8. A device for injecting a fluid puncture sealing compound through a tire valve into a vehicle tire comprising a container adapted to hold a quantity of said compound, said container having an outlet opening, a valve in said opening, said valve having a casing with an axial bore and a free end adapted to fit on a tire valve, a rod slidably mounted in the bore of the casing, said casing having a fixed end with valve seat disposed in such end and connected with the bore, a pressure cartridge with fluid under pressure therein removably connected with the fixed end of the casing, said pressure cartridge having a rupturable wall, said rod having one end adapted to engage the valve pin of a tire valve and another pointed end adapted to puncture said rupturable wall and a valve closing member on the rod adjacent the pointed end of the rod adapted to fit said valve seat.

9. A device for injecting a fluid puncture sealing compound through a tire valve into a vehicle tire comprising a container adapted to hold a quantity of said compound, said container having an outlet opening, a valve in said opening, said valve having a casing with an axial bore and a free end adapted to fit on a tire valve, a rod slidably mounted in the bore of the casing, said casing having a fixed end with valve seat disposed in such end and connected with the bore, a pressure cartridge with fluid under pressure therein removably connected with the fixed end of the casing, said pressure cartridge having a rupturable wall, said rod having one end adapted to engage the valve pin of a tire valve and another pointed end adapted to puncture said rupturable wall and a valve closing member on the rod adjacent the pointed end of the rod adapted to fit said valve seat, and a cup-shaped member secured to the fixed end of the casing and disposed inside the container, said cup-shaped member being adapted slidably to receive said valve closing member and having a side port opening divisible into two spaced ports by the valve closing member.

10. A device for injecting a fluid puncture sealing compound through a tire valve into a vehicle tire comprising a container adapted to hold a quantity of said compound, said container having an outlet opening, a valve in said opening, said valve having a casing with an axial bore and a free end adapted to fit on a tire valve, a rod slidably mounted in the bore of the casing, said casing having a fixed end with valve seat disposed in such end and connected with the bore, a pressure cartridge with fluid under pressure therein removably connected with the fixed end of the casing, said pressure cartridge having a rupturable wall, said rod having one end adapted to engage the valve pin of a tire valve and another pointed end adapted to puncture said rupturable wall and a valve closing member on the rod adjacent the pointed end of the rod adapted to fit said valve seat, and a cup-shaped member secured to the fixed end of the casing and disposed inside the container, said cup-shaped member being adapted slidably to receive said valve closing member and having a side port opening divisible into two spaced ports by the valve closing member, said free end of the rod having a tire valve pin receiving recess.

11. A device for injecting a fluid puncture sealing compound through a tire valve into a vehicle tire comprising a container adapted to hold a quantity of said compound, said container having an outlet opening, a valve in said opening, said valve having a casing with an axial bore and a free end adapted to fit on a tire valve, a rod slidably mounted in the bore of the casing, said casing having a fixed end with valve seat disposed in such end and connected with the bore, a pressure cartridge with fluid under pressure therein removably connected with the fixed end of the casing, said pressure cartridge having a rupturable wall, said rod having one end adapted to engage the valve pin of a tire valve and another pointed end adapted to puncture said rupturable wall and a valve closing member on the rod adjacent the pointed end of the rod adapted to fit said valve seat, and a cup-shaped member secured to the fixed end of the casing and disposed inside the container, said cup-shaped member being adapted slidably to receive said valve closing member and having a side port opening divisible into two spaced ports by the valve closing member, said free end of the rod having a tire valve pin receiving recess, said pressure cartridge being a $CO_2$ cylinder with an externally threaded end, said rupturable wall being disposed in the cylinder adjacent said threaded end, and said cup-shaped member having a free internally threaded open end removably to receive the externally threaded end of said cylinder.

12. A device for injecting a fluid puncture sealing compound into a vehicle tire comprising a container adapted to hold a quantity of said compound, the container having an outlet, a closure for said outlet, an elongated bearing member having a central longitudinal bore connected to said closure and extending inwardly of the container, a valve seat at the inner end of said elongated bearing member communicating with said bore, a valve stem within said bore and terminating in a valve adapted to seat on said valve seat, said valve stem extending outwardly of said bearing member, an interior casing adapted to receive therewithin a compressed gas capsule with the puncture end of the latter disposed lowermost, means at the lower end of said casing for puncturing said capsule upon downward movement therewithin, said means including a piercing prong with a side indentation, the lower end of said valve stem bearing on the upper end of the capsule whereby to force the latter downwardly upon downward movement of said valve stem, and vent means permitting discharge of the compressed gas into the interior of the container proper and communicating with said valve seat whereby to urge the valve into a closed position under internal pressure.

13. A device for injecting a fluid puncture sealing compound through a tire valve into a vehicle tire comprising a container adapted to hold a quantity of said compound, said container having an outlet opening, a valve in said opening, said valve having a casing with an axial bore and a free end adapted to fit on a tire valve, a rod slidably mounted in the bore of the casing, said casing have a fixed end with valve seat disposed in such end and connected with the bore, a pressure cartridge with fluid under pressure therein removably connected with the fixed end of the casing, said pressure cartridge having a rupturable wall, said rod having one end adapted to engage the valve pin of a tire valve and another pointed end with a side indentation adapted to puncture said rupturable wall and a valve closing member on the rod adjacent the pointed end of the rod adapted to fit said valve seat.

14. A device for discharging a fluid compound under pressure and for injecting the compound into a hollow device, comprising a container, a tubular member connected with said container, with the bore thereof opening into said container and through which bore the material is discharged from the container, a valve rod slidable in said bore and normally closing the bore, a capsule containing fluid under pressure, means mounting said capsule within said container, and means for puncturing said capsule with the inward movement of said rod for opening said bore for the discharge of the material.

References Cited in the file of this patent
UNITED STATES PATENTS

| | | |
|---|---|---|
| 927,798 | Hoff | July 13, 1909 |
| 2,160,043 | Threm | May 30, 1939 |
| 2,208,490 | Axtell et al. | July 16, 1940 |
| 2,659,629 | Graham | Nov. 17, 1953 |
| 2,667,993 | Ayres | Feb. 2, 1954 |